W. A. WARMAN.
CAMERA.
APPLICATION FILED MAR. 29, 1916.

1,257,656.

Patented Feb. 26, 1918.
2 SHEETS—SHEET 1.

Witnesses:

William A. Warman, Inventor
By Attorneys
George Cook & Sons

W. A. WARMAN.
CAMERA.
APPLICATION FILED MAR. 29, 1916.

1,257,656.

Patented Feb. 26, 1918.
2 SHEETS—SHEET 2.

UNITED STATES PATENT OFFICE.

WILLIAM A. WARMAN, OF NEW YORK, N. Y., ASSIGNOR TO KELLER MECHANICAL ENGRAVING COMPANY, OF BROOKLYN, NEW YORK, A CORPORATION OF NEW YORK.

CAMERA.

1,257,656.   Specification of Letters Patent.   Patented Feb. 26, 1918.

Application filed March 29, 1916. Serial No. 87,416.

*To all whom it may concern:*

Be it known that I, WILLIAM A. WARMAN, a citizen of the United States, and a resident of New York, borough of Manhattan, in the county of New York and State of New York, have made and invented certain new and useful Improvements in Cameras, of which the following is a specification.

My invention relates to photographic cameras in which a sensitized film is used, and particularly to cameras of the fixed focus type and in which the mechanism thereof is inclosed in a casing, so that the camera may be readily carried in the pocket.

While various features of my invention are applicable generally to cameras of the type above referred to, my invention especially relates to cameras in which the portion of the film to be exposed is so supported as to present a curved surface concentric with a line passing through the optical center of the lens and to cameras in which the light reaches the film through a narrow slot moving adjacent thereto and provided at the free end of a hollow swinging member which carries the lens, which member swings upon an axis passing through the optical center of the lens.

The feature of a swinging member having a narrow slot through which the light reaches the film is a feature found in cameras commonly referred to as "panoramic" cameras, and in which the view taken extends throughout a wide angle, often as great as 150°. In my camera, however, the angle of the view is not excessive, but corresponds approximately with the angle included in the use of a lens the position of which is fixed relative to the camera casing. I secure, however, decided practical advantages by the use of a swinging lens carrying member in that a much cheaper and simpler lens may be employed without an accompanying distortion of the picture, as the scheme of permitting the light to fall upon a curved film through a narrow moving slot avoids the distortion which would otherwise be encountered in using a simple and cheap lens and secures a picture free from distortion to a degree not attainable with a camera in which the lens is held stationary, unless an expensive lens is used.

The principal object of my invention is to provide what may be termed safety mechanism in cameras of the type above referred to, by means of which it is impossible to expose the film to the action of light while a new portion of the film is being wound into a position to be exposed; and other objects of my invention are to provide mechanism whereby the act of winding a fresh portion of the film into a position to be exposed will automatically reset the mechanism and leave it in a condition to make a second exposure, to provide mechanism for closing the opening through which light enters the camera casing at the time when the film is being advanced, to provide means for locking the parts in the position which they assume at the end of an exposure, to provide an improved form of exterior casing, to provide improved film supporting mechanism, and to provide such other improvements in and relating to cameras of the type above referred to as are hereinafter described and claimed.

With the above and other objects in view my invention consists in the improved camera and subcombinations of the elements forming the same illustrated in the accompanying drawings, described in the following specification, and particularly claimed, and in such variations and modifications thereof as will be obvious to those skilled in the art to which my invention relates.

In the drawings, wherein the preferred embodiment of my invention is illustrated:

Figure 1:
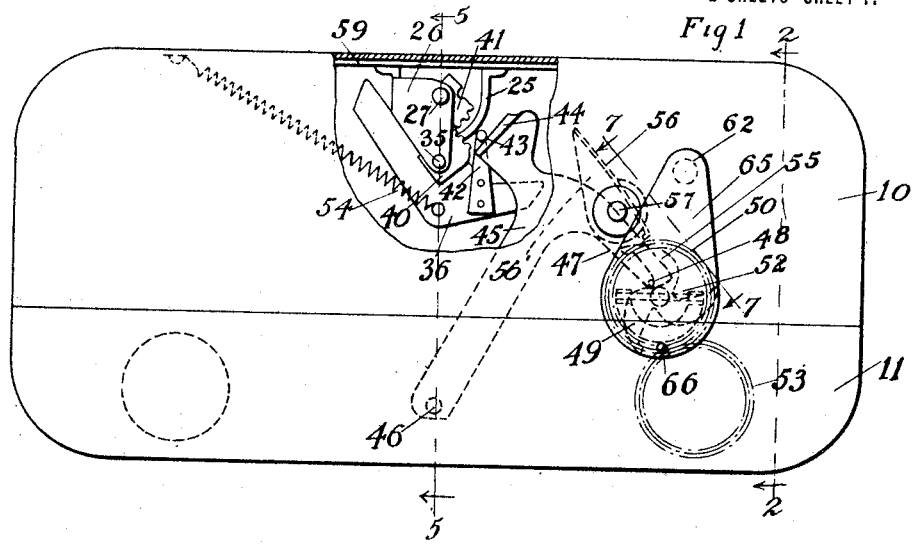
Figure 1 is a view showing my improved camera in plan, with a portion of the top wall of the casing broken away to show parts of the mechanism within the casing.
Figure 2:
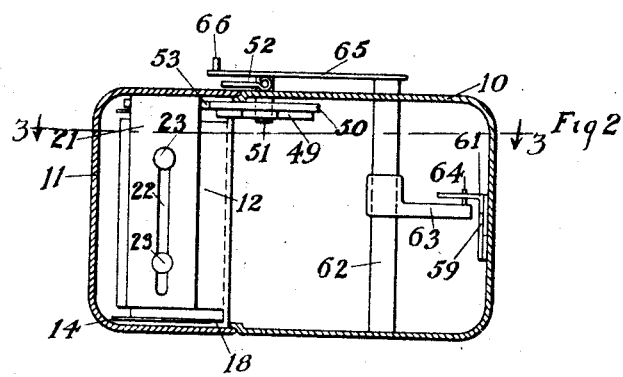
Fig. 2 is a view showing a section upon a vertical transverse plane, indicated by the lines 2—2 in Fig. 1.
Figure 6:
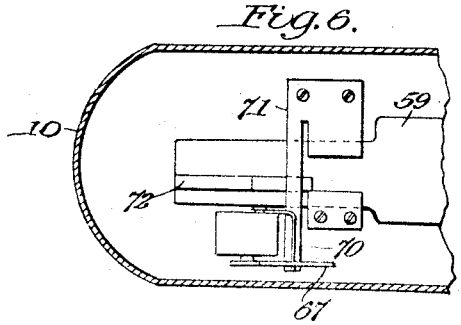
Figure 7:
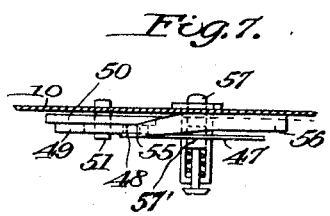
Figure 3:
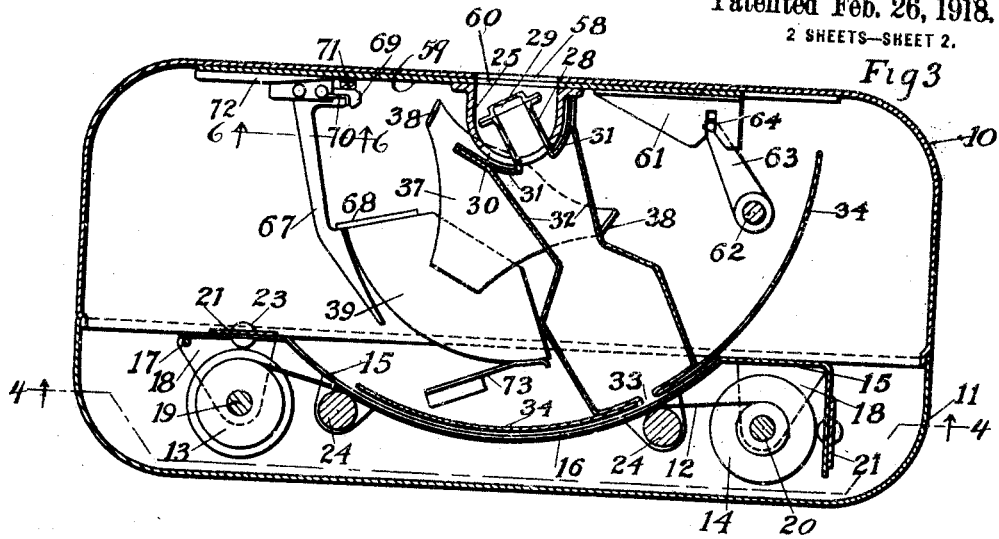
Fig. 3 is a view showing a section upon a horizontal plane, indicated by the lines 3—3 in Fig. 2.

Figs. 6 and 7 are fragmental views in section taken on the lines 6—6 and 7—7 of Figs. 3 and 1, respectively, showing certain details of the operating members of the camera.

Referring to the drawings wherein the same parts are designated by the same reference numerals in all the views, the reference numerals 10, 11 designate the two parts of a separable two-part exterior casing, the juncture between the two being effected by reducing the meeting extremity of one of the parts, allowing it to move within and resiliently engage the meeting extremity of the other of the casing parts, although it is to be noted that any desirable and convenient form of joint may be utilized for the securement of parts of the casing together and within which the various elements which form the camera are contained, the mechanism concerned with the exposure of the film to the action of light being located within the front portion 10 while the film itself is supported and held in proper position by suitable film supporting mechanism located within the rear portion 11, so that upon removing said rear portion an exposed film may be removed from the camera and an unexposed film substituted therefor. The edges and corners of the casing are rounded, as shown, so that the camera may be conveniently carried in the pocket without injuring the same, and in order to provide a neater appearing camera.

The film which is flexible as will be understood is shown at 12, and the same is supported upon spools 13, 14; the film being unwound from the spool 13 and wound onto the spool 14 to bring successive portions thereof into position to be exposed.

Figure 4:
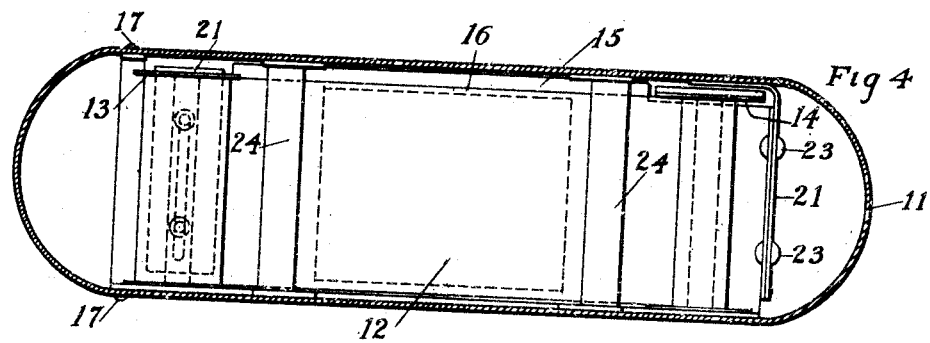
Fig. 4 is a view showing a section upon a vertical longitudinal plane, indicated by the dotted lines 4—4 in Fig. 3, and showing the film supporting mechanism of the camera.
Figure 5:
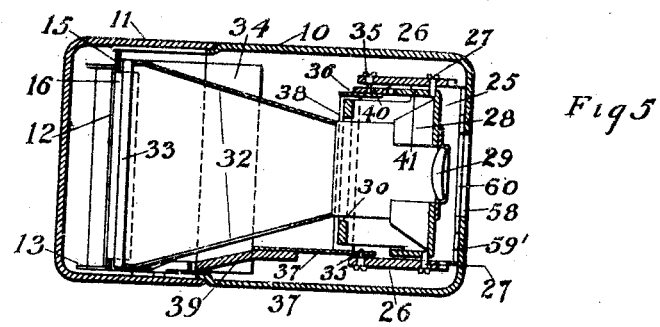
Fig. 5 is a view showing a section upon a vertical central transverse plane, indicated by the dotted lines 5—5 in Fig. 2; and—

The film spools are supported by a metal film plate 15, extending throughout the height of the casing and the central portion of which is cut away as shown at 16 to thereby permit the light to fall upon the front sensitized surface of the film as will hereinafter appear. The portions of the plate above and below the opening 16 form guides and supports for the upper and lower edges of the film, and the central portion of said plate is curved so that the portion of the film being exposed within the opening 16 is made to assume the form of a segment of a cylinder, the axis of which passes through the optical center of the lens of the camera. The film plate is pivotally secured to the rear portion or back 11 of the casing at 17, from which it will be seen that the entire film supporting mechanism may be swung free from the back after the back has been removed, to thereby facilitate the removal of an exposed film and the substitution of an unexposed one therefor. Said plate is provided with ears 18, which form bearings for the lower ends of the axles 19, 20 of the film spools; and the upper ends of these axles are supported in the overhanging free ends of right angular supports 21 carried by the film plate and having each a slot, such as is shown at 22, through which fastening members 23 extend into the film plate; whereby said supports may be moved vertically and the upper ends of the axles of the film spools thus released, as will be understood. Rollers 24 are provided to assist in holding the portion of the film being exposed in shape and in proper position; the ends of said rollers having bearings in ears carried by the film plate, as shown in Figs. 3 and 4.

The front portion 10 of the casing is provided with a housing 25 secured upon the inner surface of its front wall, and arms 26 extend from the housing partly across the upper and lower ends thereof to provide supports for pivots 27 which support a swinging lens carrier 28 provided with a lens 29; the location of the pivots being in line with the optical center of the lens so that the lens carrier and lens oscillate about an axis extending through the optical center of the lens. The lens carrier extends through a slot 30 provided in the housing 25, and the same is prolonged beyond the housing, and curved as shown at 31, these curved portions moving close to the slot 30 in the housing as the lens carrier oscillates to thereby prevent light from leaking through the slot and into the interior of the casing. The lens carrier is provided with a hood 32 shown as secured to the curved portions 31 thereof and which hood terminates close to the film and is provided with a vertically extending narrow slot 33 which moves adjacent the film and through which slot the light reaches the film; the lens carrier and hood forming a hollow swinging member through which the light passes to the film, as will be understood. The hood in question is preferably provided with curved wings 34 of sufficient length to keep the opening 16 in the film plate covered at all times to thereby shield the film from light which may leak into the casing.

The arms 26 at the upper and lower ends of the housing 25 serve also as supports for pivots 35 which engage and support a swinging frame having upper and lower end members 36, 37, and vertically extending connecting bars 38. The lower member 37 of this frame carries a counterweight 39 while the upper member 36 carries a toothed segment 40, the teeth of which engage a similar toothed segment 41 secured to the lens carrier 28; from which it follows that the lens carrier and hood carried by it, and the swinging frame and counterweight which it supports, move in opposite directions and thus secure a smooth, balanced, and uniform movement of the moving parts of the camera when an exposure is made, and whereby jars or vibration during an exposure, are avoided. A friction spring 73 may also be used to retard the movement of the parts and secure a smoother movement, which spring contacts with the periphery of the counterweight, as shown.

The upper member 36 of the swinging frame is provided with an arm 42 having a pin 43 at its free end and which pin is adapted to be engaged by a lug 44 upon a setting lever 45 pivotally supported from the casing at 46, so that as said setting lever is swung toward the left, Fig. 1, motion will be communicated to the swinging frame through the lug 44, pin 43, and arm 42; and to the lens carrier through the toothed segments; the result being that the swinging frame and lens carrier are swung about their supporting pivots hereinbefore referred to and the carrier and hood moved from the positions shown in Figs. 1 and 3 (which are the positions assumed by the parts at the end of an exposure) into a position in which the parts are set and in a condition to expose a new and unexposed portion of the film; the mechanism herein referred to constituting, in connection with suitable operating means therefor, setting mechanism whereby and by means of which the hollow swinging member formed by the lens carrier and hood is moved into a proper position to make an exposure when said members are released.

Motion is communicated to the setting lever 45 through an arm 47 carried thereby and the free end of which is provided with a pin 48, which pin is engaged by a cam 49 shown as having three lobes, although it will be understood that a different particular form of cam may be used. This cam is shown as secured upon the under side of a gear 50, and both the cam and gear are shown as carried by a shaft 51 extending through the top wall of the casing and having a winding key 52 at its upper end, the key, shaft, and gear constituting a winding member, and the gear being in driving engagement with a second gear 53 upon the axle 20 of the film spool 14.

It therefore follows that when the winding member is rotated the spool 14 of the film supporting mechanism will be driven through the gears 50, 53, and the film will be advanced and a fresh portion thereof brought into a position to be exposed. This forward movement of the film will be accompanied by a simultaneous movement of the lens carrier and hood from the position in which they are illustrated in Figs. 1 and 3 toward the left and into a set position; motion being transmitted from the cam 49 through the pin 48, arm 47, setting lever 45, lug 44, pin 43 and arm 42 to the swinging frame hereinbefore referred to, and from the frame to the lens carrier and hood through the toothed segments 40, 41 as will be understood. At the end of the movement of the parts above referred to they are caught and held in a set condition and ready, upon being released, to make a second exposure.

This movement of the parts into a set position takes place against the tension of a spring 54, one end of which is secured to the inner surface of the section 10 and the other to the upper member 36 of the swinging frame, which spring acts to return the parts to their exposed position when the mechanism is released to make an exposure.

At the end of the movement of the parts into a set position as herein explained, the offset end 55 of a spring latch 56, which is secured at one extremity to the casing 10 by the plate 56', engages the free end of the arm 47 and holds the parts in a set position. A releasing member 57 is provided with a notch or groove 57', which slidably receives the arm 47 therein. The arm 47 is formed of thin material, so as to be resilient, so that as the releasing member 57 is depressed, the arm 47 is moved below and out of engagement with the lug 55. Immediately upon the releasement of the various parts, the spring 54 draws them to the initial position as shown in Figs. 1 and 3, during which movement an exposure is made. The resiliency of the arm 47 returns the releasing member 57 to its original and elevated position.

The front portion 10 of the casing is provided with an opening 58 leading into the housing 25, and the reference numeral 59 designates a movable light intercepting member shown as comprising a reciprocating slide movable in guides 59' provided upon the inner surface of the front of the casing and having an opening 60 adapted to register with the opening 58, but which slide, when moved to the right, Fig. 3, will close said opening and prevent light from reaching the lens. This slide is shown as provided with a slotted arm 61 through which motion may be communicated thereto, and 62 designates a shaft supported in bearings in the casing and carrying an arm 63 having a pin 64 adapted to engage the slot in the arm 61. The upper end of this shaft extends to the outside of the casing and carries a movable guard member shown as comprising a shield 65 of sufficient size to cover the winding key herein referred to, said shield having a knob 66 for operating it, see Fig. 1; and this guard cooperates with the winding and releasing members in such a way as to permit one only of said members to be operated at a time, as hereinafter appears.

The relative arrangement of the winding key 52, the shield 65, the releasing member 57, and the slide 59, is such that when the shield is in a position such that it overlies the winding key, the openings 58 and 60 will register and the releasing member will be uncovered, so that it may be depressed to make an exposure; and such that when the shield is moved to expose the winding key the slide 59 will close the opening 58 and the shield will cover the releasing member, so that it cannot be depressed either purposely or inadvertently and the film thereby exposed. The opening leading into the housing 25 and admitting light to the lens is, therefore, closed when a fresh portion of film is being wound into a position to be exposed; from which it follows that no light can enter the camera casing nor can the releasing member be depressed to make an exposure while the parts are so positioned that the winding key can be operated. After a new portion of the film has been wound into a position to be exposed the shield is swung back into its original position over the winding key, and the parts are left in a condition such that when released by depressing the releasing member 57 an exposure will be made, as hereinbefore explained, the act of winding having set the parts and left them in a set position ready to make an exposure.

It will be understood that the rear portion of the camera casing will be provided with a transparent window through which numbers on the back of the film can be seen, so that the user can tell when an unexposed portion of film sufficient for a picture has been moved opposite the opening 16 and into the field of the instrument, and when to cease winding.

The reference numeral 67 designates a pivotally supported latch the free end of which engages a lug 68 carried by the counterweight 39 at the end of the movement of the parts during which an exposure has been made, and thus catches and holds the parts after an exposure has been made, as will be understood from Fig. 3. This latch is provided with an arm 69 upon which a spring 70 acts in such a way as to hold the free end of the latch toward the right, Fig. 3, so as to be in a position to catch the parts at the end of an exposure, as hereinbefore explained.

The parts, however, must obviously be released from the latched condition prior to winding a fresh portion of film and resetting, and, in order to accomplish this result, a vertically extending latch operating member 71 is provided, one end of which is secured to the inner surface of the front of the casing 10 and the other or free end of which extends beneath the arm 69 of the latch 67, and 72 designates a cam upon the reciprocating slide 59, which, as the slide is moved toward the right, moves beneath the latch operating member 71 and forces its free end against the arm 69 of the latch aforesaid; thereby swinging the free end of the latch 67 out of engagement with the lug 68 and leaving the parts free to be operated, or reset, as the winding key is operated.

Having thus described and explained my invention, I claim and desire to secure by Letters Patent:

1. In a film camera, film supporting mechanism; a winding member adapted to operate said supporting mechanism to advance the film; means for exposing the film to the action of light; a releasing member for controlling said exposing means; and a movable guard adapted to coöperate with said winding and releasing members to permit one only of said members to be operated at a time.

2. In a film camera, film supporting mechanism; a winding member adapted to operate said supporting mechanism to advance the film; a pivotally supported hollow swinging member having a slot adapted to move adjacent the film; a spring and connections for moving said swinging member; means for locking said swinging member against motion; a releasing member for unlocking said holding means to permit said spring to act; and a movable guard adapted to coöperate with said winding and releasing members to permit one only of said members to be operated at a time.

3. In a film camera, film supporting mechanism; a winding member adapted to operate said supporting mechanism to advance the film; a pivotally supported hollow swinging member having a slot adapted to move adjacent the film; a spring and connections for moving said swinging member; a releasing member for releasing said swinging member to permit said spring to act; and means controlled by said releasing member adapted to engage said swinging member and maintain the same stationary; a movable guard adapted to coöperate with said winding and releasing members to permit one only of said members to be operated at a time; and setting mechanism intermediate said swinging and winding members and through which said swinging member is moved against the action of said spring as said winding member is operated.

4. In a film camera, a suitable casing; a film supporting mechanism located within said casing; a winding member operable from without the casing and adapted to operate said film supporting mechanism to advance the film; means for exposing the film to the action of light; a releasing member operable from without the casing for controlling said exposing means; and a movable shield located without the casing and adapted to be moved into positions to overlie either said winding or said releasing member.

5. In a film camera, a suitable casing; film supporting mechanism located within said casing; a winding member operable from without the casing and adapted to operate said film supporting mechanism to advance the film; a pivotally supported hollow swinging member having a slot adapted to move adjacent the film; a spring and connections for moving said swinging member; means engaging and adapted to hold said swinging member against motion; a releasing member operable from without the casing engaging the said locking means, and adapted to release said swinging member and permit said spring to act; and a shield located without the casing and movable into positions to overlie either said winding member or said releasing member.

6. In a film camera, a suitable casing; film supporting mechanism located within said casing; a winding member operable from without the casing and adapted to operate said film supporting mechanism to advance the film; a pivotally supported hollow swinging member having a slot adapted to move adjacent the film; a spring and connections for moving said swinging member; holding means adapted to engage said swinging member; a releasing member operable from without the casing and adapted to release said holding means to permit said spring to act; a shield located without the casing and movable into positions to overlie either said winding member or said releasing member; and setting mechanism intermediate said swinging member and said winding member and through which said swinging member is moved against the action of said spring as said winding member is operated.

7. In a film camera, a suitable casing having an opening in its front wall; a light intercepting member having an opening, and which member is movable into positions to bring its opening into and out of register with the opening in the casing; film supporting mechanism located within said casing; a winding member operable from without the casing and adapted to operate said film supporting mechanism to advance the film; means for exposing the film to the action of light; a movable shield located without the casing and adapted to overlie and to be moved away from over said winding member; and mechanism intermediate said shield and said light intercepting member and through which said last mentioned member is moved to close the opening in said casing when said shield is moved to permit access to said winding member.

8. In a film camera, a suitable casing having an opening in its front wall; a light intercepting member having an opening, and which member is movable into positions to bring its opening into and out of register with the opening in the casing; film supporting mechanism located within said casing; a winding member operable from without the casing and adapted to operate said film supporting mechanism to advance the film; means for exposing the film to the action of light; a releasing member operable from without the casing for controlling said exposing means; a movable shield located without the casing and adapted to be moved into positions to overlie either said winding member or said releasing member; and mechanism intermediate said shield and said light intercepting member and through which motion is communicated to said last mentioned member as said shield is moved.

9. In a film camera, a suitable casing having an opening in its front wall; a reciprocating slide having an opening adapted to register with the opening in said casing; film supporting mechanism located within said casing; a winding member operable from without the casing and adapted to operate said film supporting mechanism to advance the film; a pivotally supported hollow swinging member having a slot adapted to move adjacent the film; a spring and connections for moving said swinging member; means for holding said swinging member against motion, a releasing member operable from without the casing engaging said holding means and adapted to release said swinging member and permit said spring to act; a shield located without the casing and movable into positions to overlie either said winding member or said releasing member; and mechanism intermediate said shield and said slide and through which motion is communicated to said slide as said shield is moved.

10. In a film camera, a suitable casing having an opening in its front wall; a reciprocating slide having an opening adapted to register with the opening in said casing; film supporting mechanism located within said casing; a winding member operable from without the casing and adapted to operate said film supporting mechanism to advance the film; a pivotally supported hollow swinging member having a slot adapted to move adjacent the film; a spring and connections for moving said swinging member; holding means engaging said swinging member and adapted to lock the same against motion; a releasing member operable from without the casing engaging said holding means and adapted to release said swinging member and permit said spring to act; a shield located without the casing and movable into positions to overlie either said winding member or said releasing member; mechanism intermediate said shield and said slide and through which motion is communicated to said slide as said shield is moved; and setting mechanism intermediate said swinging member and said winding member and through which said swinging member is moved against the action of said spring as said winding member is operated.

11. In a film camera, film supporting mechanism; a winding member adapted to operate said supporting mechanism to advance the film; a pivotally supported hollow swinging member having a slot adapted to move adjacent the film; means for preventing light from reaching the film; a spring and connections for moving said swinging member; holding means engaging said swinging member; a releasing member for releasing said holding means to permit said spring to act; and setting mechanism intermediate said swinging and winding members and through which said swinging member is moved against the action of said spring as said winding member is operated.

12. In a film camera, a suitable casing having an opening in its front wall; means for closing said opening to prevent the passage of light therethrough; film supporting mechanism located within said casing; a winding member operable from without the casing and adapted to operate said film supporting mechanism to advance the film; a hollow swinging member pivotally supported adjacent the opening in said casing and having a slot adapted to move adjacent the film; a spring and connections for moving said swinging member; holding means engaging said swinging member; a releasing member operable from without the casing, engaging said holding means, and adapted to release said swinging member and permit said spring to act; and setting mechanism intermediate said swinging and winding members, and through which said swinging member is moved against the action of said spring as said winding member is operated.

13. In a film camera, a suitable casing having an opening in its front wall; means for closing said opening to prevent the passage of light therethrough; film supporting mechanism located within said casing; a winding member operable from without the casing and adapted to operate said film supporting mechanism to advance the film; a hollow swinging member pivotally supported adjacent the opening in said casing and having a slot adapted to move adjacent the film; a spring for moving said swinging member; a releasing member operable from without the casing and adapted to release said swinging member and permit said spring to act; a cam operatively connected with said winding member; a setting lever operated by said cam; means intermediate said setting lever and said swinging member and through which said swinging member is moved against the action of said spring as said winding member is operated; and means for holding the parts in a set condition until released by said releasing member.

14. In a film camera, a suitable casing having an opening in its front wall; means for closing said opening to prevent the passage of light therethrough; film supporting mechanism located within said casing; a winding member operable from without the casing and adapted to operate said film supporting mechanism to advance the film; a hollow swinging member pivotally supported adjacent the opening in said casing and having a slot adapted to move adjacent the film; a spring for moving said swinging member; a cam operatively connected with said winding member; a setting lever operated by said cam; means intermediate said setting lever and said swinging member and through which said swinging member is moved against the action of said spring as said winding member is operated; means engaging said setting lever for holding the parts in a set condition; and a releasing member operable from without the casing and adapted to release the parts and permit said spring to act.

15. In a film camera, a suitable casing having an opening in its front wall; means for closing said opening to prevent the passage of light therethrough; film supporting mechanism located within said casing and including a film spool having a gear; a winding member operable from without the casing and having a gear adapted to engage said gear upon said film spool; a hollow swinging member pivotally supported adjacent the opening in said casing and having a slot adapted to move adjacent the film; a spring for moving said swinging member; a cam secured to said winding member; a setting lever operated by said cam; means intermediate said setting lever and said swinging member and through which said swinging member is moved against the action of said spring as said winding member is operated; a spring latch for engaging said setting lever to thereby hold the parts in a set condition; and a releasing member operable from without the casing and adapted to disengage said setting lever from said spring latch to thereby permit said spring to act.

16. In a film camera, a suitable casing having an opening in its front wall; a reciprocating slide having an opening adapted to register with the opening in said casing; film supporting mechanism located within said casing; a winding member operable from without the casing and adapted to operate said film supporting mechanism to advance the film; means for exposing the film to the action of light; an oscillating shaft supported in bearings provided in said casing; a shield secured to said shaft and located without the casing, and which shield is adapted to overlie and to be moved from over said winding member; and an arm carried by said shaft and the free end of which is in operative engagement with said slide.

17. In a film camera, a suitable casing; film supporting mechanism located within said casing; a housing supported from said casing; a hollow swinging member pivotally supported from said housing and having a slot adapted to move adjacent the film; means for operating said swinging member; a swinging frame pivotally supported from said housing; and connecting mechanism intermediate said swinging member and frame and through which said member and frame are caused to move in opposite directions.

18. In a film camera, a suitable casing; film-supporting mechanism located within said casing; a housing supported from said casing; a hollow swinging member pivotally supported from said housing and having a slot adapted to move adjacent the film; a toothed member carried by said swinging member; a swinging frame pivotally supported from said housing; a counterweight carried by said frame; a toothed member carried by said frame and in engagement with the toothed member upon said swinging member; means for moving said frame in one direction; and a spring for returning said frame to its initial position.

19. In a film camera, film supporting mechanism; a pivotally supported hollow swinging member having a slot adapted to move adjacent the film; means for moving said swinging member into a set position preparatory to making an exposure; means for releasing said swinging member; a spring for moving said member after it has been released to make an exposure; means for holding said swinging member in the position which it assumes at the end of an exposure; and means for releasing said swinging member prior to resetting said member to make a second exposure.

20. In a film camera, a suitable casing having an opening in its front wall; a reciprocating slide having an opening adapted to register with the opening in said casing; film supporting mechanism located within said casing; a pivotally supported hollow swinging member having a slot adapted to move adjacent the film; means for moving said swinging member into a set position; means for releasing said swinging member; a spring for moving said swinging member to make an exposure; a latch adapted to hold said swinging member in the position it assumes at the end of an exposure; and means operated by said slide for releasing said latch prior to returning said swinging member into a set position.

21. In a film camera, a suitable casing having an opening in its front wall, a reciprocating slide having an opening adapted to register with the opening in said casing; film supporting mechanism located within said casing; a pivotally supported hollow swinging member having a slot adapted to move adjacent the film; a pivotally supported frame; toothed members carried by said swinging member and frame and in engagement with one another whereby said member and frame move in opposite directions; means for moving said swinging member into a set position; means for releasing said swinging member; a spring for moving said swinging member to make an exposure; a latch for catching said frame and holding the parts in the position they assume at the end of an exposure; and means operated by said slide for releasing the parts preparatory to resetting them to make a second exposure.

22. In a film camera, a casing comprising two parts detachably connected with one another; mechanism supported within the front portion of said casing for exposing the film to the action of light; a film plate pivotally supported within the rear portion of said casing; two film spools supported by said film plate and upon which the film is wound; a gear operatively connected with one of said spools; and a winding member supported in the front portion of said casing and having a gear adapted to engage the gear aforesaid to thereby advance the film.

23. In a film camera, a film supporting plate having an opening through which light may reach the film; a pivotally supported hollow swinging member having a slot adapted to move adjacent said plate and through which member and slot light may pass to the film; curved wings carried by said swinging member and arranged to move adjacent said plate and the extent of which is sufficient to keep said opening covered at all times; and means for moving said swinging member.

24. In a film camera, film supporting mechanism adapted to support a film; a pivotally supported hollow swinging member having a slot adapted to move adjacent the film and through which member and slot light may pass to the film curved wings carried by said swinging member and arranged to move adjacent the film and the extent of which is sufficient to keep the portion of the film being exposed covered at all times; and means for moving said swinging member.

Signed at Brooklyn, borough of Brooklyn, in the county of Kings and State of New York, this 13th day of March, A. D. 1916.

WILLIAM A. WARMAN.

Witnesses:
F. Dreyfuss,
S. A. Keller.